United States Patent
Ruffa

(10) Patent No.: US 6,494,158 B1
(45) Date of Patent: Dec. 17, 2002

(54) METHOD FOR REDUCING STRUM IN TOW CABLES

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/718,759

(22) Filed: Nov. 24, 2000

(51) Int. Cl.⁷ ............................. B63B 21/56; G01V 1/38
(52) U.S. Cl. .......................................... 114/253; 367/16
(58) Field of Search ................................ 114/244, 242, 114/243, 253, 254; 367/15, 16, 19

(56) References Cited

U.S. PATENT DOCUMENTS

| | | | | |
|---|---|---|---|---|
| 3,596,070 A | * | 7/1971 | McCool et al. | 114/245 |
| 3,801,071 A | * | 4/1974 | Barron | 114/254 |
| 3,860,899 A | * | 1/1975 | Watlington | 367/131 |
| 3,884,173 A | * | 5/1975 | Fabula | 114/243 |
| 4,210,897 A | * | 7/1980 | Hutchins | 114/244 |
| 4,281,402 A | * | 7/1981 | Kruka et al. | 367/15 |
| 4,314,363 A | * | 2/1982 | Thigpen et al. | 114/244 |
| 4,570,245 A | * | 2/1986 | Thigpen | 254/274 |
| 4,581,723 A | * | 4/1986 | Savit | 254/274 |
| 4,910,715 A | * | 3/1990 | Savit | 174/101.5 |
| 5,275,120 A | * | 1/1994 | Ruffa et al. | 114/243 |
| 5,381,909 A | * | 1/1995 | Warnan | 114/244 |
| 5,790,472 A | * | 8/1998 | Workman et al. | 367/16 |
| 6,244,204 B1 | * | 6/2001 | Weyman | 114/243 |

* cited by examiner

Primary Examiner—S. Joseph Morano
Assistant Examiner—Andrew Wright
(74) Attorney, Agent, or Firm—Michael J. McGowan; Michael F. Oglo; James M. Kasischke

(57) ABSTRACT

A method for reducing strum in tow cables. Such tow cables typically extend from a marine vessel and have their lengths controlled by a winch on the deck of the ship and have a tow component at their distal end. The length of the cable is adjusted so that the number of longitudinal waves is an integral number of the number of transverse waves is an odd integral number.

16 Claims, 2 Drawing Sheets

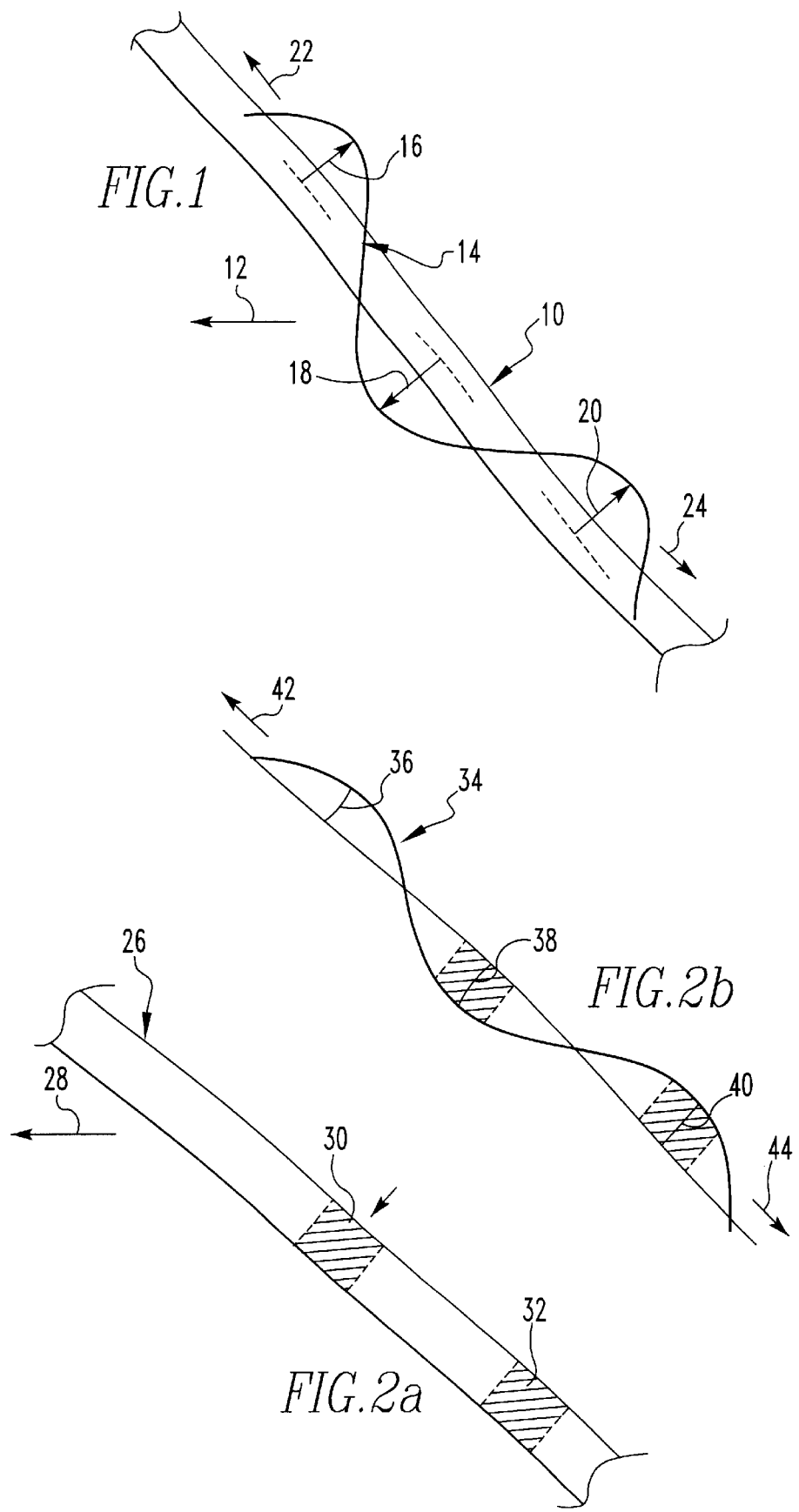

METHOD FOR REDUCING STRUM IN TOW CABLES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to towing devices and more particularly tow cables with vibration damping means.

(2) Brief Description of the Prior Art

For towed components such as arrays or streamers, strum (vortex-induced vibration) is a persistent problem. Such vibration is transmitted into the towed array or streamer, causing damage to internal components.

The prior art includes a number of patents addressed to the management of such forces in cables.

U.S. Pat. No. 5,214,244 to Cummings et al., for example, discloses an underwater cable having a flexible, elongated core surrounded by a flexible, elongated jacket. A distributed jacket includes a helically displaced phase shifter to decouple the cable from strumming produced by shedding of von Karman vortex streets from the cable.

U.S. Pat. No. 5,601,046 to Berglund discloses a variable gap, distributed-capacitance sensor that provides an output signal that is a function of its instantaneous elongation. The sensor is integrally associated with a seismic isolator section for measuring the instantaneous stretch thereof.

SUMMARY OF THE INVENTION

It is an object of the present invention to provide a still better method for reducing strum in tow cables.

The present invention is a method for reducing strum in a tow cable extending from a marine vessel. Such cables have an adjustable length. The length of the cable is adjusted so that the number of longitudinal waves is an integral number.

BRIEF DESCRIPTION OF THE DRAWINGS

Other objects, features and advantages of the present invention will become apparent upon reference to the following description of the preferred embodiments and to the drawing, wherein corresponding reference characters indicate corresponding parts in the drawing and wherein:

FIG. 1 is a schematic illustration of a tow cable showing transverse waves as may be generated by means of the method of the present invention;

FIG. 2a is a schematic illustration of a tow cable showing longitudinal waves as may be generated by means of the method of the present invention;

FIG. 2b is a graph of amplitude of the longitudinal wave corresponding to the position in FIG. 2a.

DESCRIPTION OF THE PREFERRED EMBODIMENT

Figure 3:
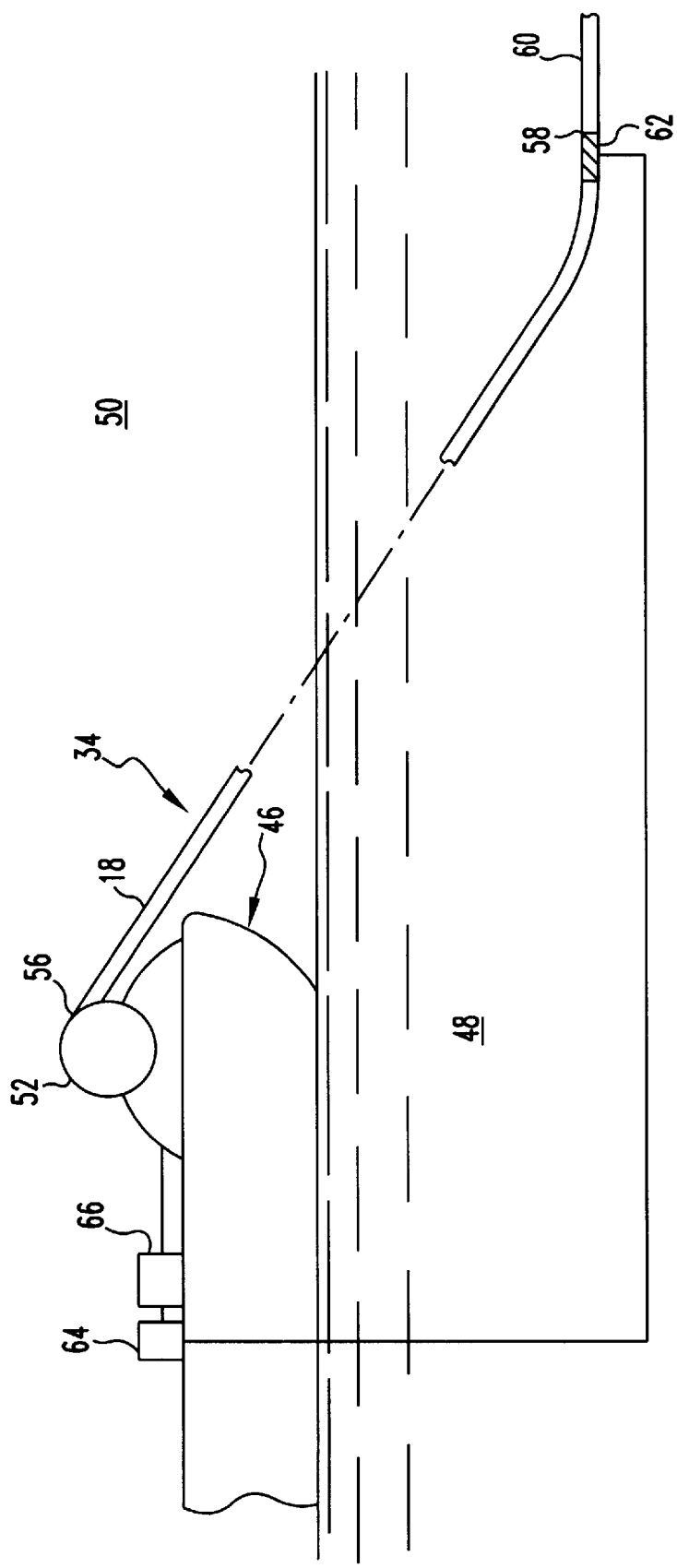
FIG. 3 is a schematic illustration of a ship and tow line illustrating the method of the present invention.

There are generally two types of waves in the tow cable: transverse waves and longitudinal waves. The transverse waves tend to have very short wavelengths since their propagation speed is approximately $$Ct=\sqrt{Tg/W},$$

where T is the tension, W is the weight per unit length, and g=9.81 m/s². In many applications, the tow cable is often very long (a mile or more) to reduce the noise radiated from the tow ship so that there are typically on the order of hundreds to thousands of transverse wavelengths in a tow cable. Because of this large number of wavelengths, there is a tremendous amount of damping on any individual wave as it travels from one end of the cable to the other. This damping prevents the establishment of standing waves (except in localized regions near reflective boundaries) because each wave will be almost completely attenuated by the time it is reflected back to its original location. Therefore, tuning the tow cable on the basis of transverse waves is all but impossible.

Longitudinal waves, on the other hand, have wavelengths that are much longer by virtue of a propagation speed governed by $$Cl=\sqrt{E/\rho}$$

where E is the cable Young's modulus and $\rho$ is the cable density. For longitudinal waves, there are only on the order of 1 to 10 wavelengths contained by a typical tow cable. Because of this fact, standing waves over the length of the cable should be easily established, and therefore, tuning should be easily achieved.

The amplitude of vibration at a towed streamer, array, or any other component is usually dominated by the longitudinal vibration component, which can be generated along the tow cable in two ways. The first way involves cable curvature: on any point on the cable, curvature causes some of the transverse component of motion to be converted into the longitudinal component and vice versa. The second way occurs due to the fact that the transverse component creates a localized region of curvature in the cable, which shortens the cable. This shortening, which generates longitudinal waves, occurs twice for each transverse wave cycle. Therefore, the frequency of the longitudinal wave is double that of the transverse wave. Note that the second way of generating longitudinal waves usually leads to much greater amplitudes than the first. This fact is especially true for "critical angle tow" in which there is essentially no curvature since virtually the entire tow cable is at its critical angle (the angle that the weight and drag balance).

The boundary conditions seen by the cable longitudinal waves are the winch (which can be modeled as a rigid boundary) and the towed component on the other end (which can be modeled as a free boundary). At the free boundary, the displacement is maximized while the tension approaches zero. If there are approximately an integral number of longitudinal wavelengths contained in the cable, the vibration at the aft end will be minimized. If, on the other hand, there are approximately an odd integral number of half wavelengths contained in the cable, the longitudinal vibration at the aft end will be maximized.

Referring to FIG. 1, the generation of transverse waves according to this invention is illustrated in which a tow cable is shown at 10. There is also shown the direction of tow 12 and a transverse wave 14. The maximum positive and negative amplitudes of the transverse wave are shown at 16 and 18, and another maximum positive amplitude is shown at 20. Directions of propagation are respectively at 22 and 24 in opposite directions coaxial with tow cable 10.

Referring to FIG. 2a, there is shown a tow cable 26 and the direction of tow 28. Compressed region 30 is shown in which the strain is negative. A stretch region 32 is also shown where the strain is positive. Referring to FIG. 2b, a graph of amplitude of the longitudinal wave against position is shown. The longitudinal wave 34 has a maximum positive amplitude 36, a maximum negative amplitude 38 and another maximum amplitude 40. Directions of propagation are coaxial with the cable at opposite directions 42 and 44.

Referring to FIG. 3, a ship 46 is shown as well as a body of water 48 and atmosphere 50. Mounted on the deck of the ship 46 there is a winch 52. Tow cable 34 extends from winch 52 from a rigid boundary 56 and its proximate end to a free boundary 58 at its distal end. Beyond the free boundary 58 there is a tow component 60 and an accelerometer 62. The accelerometer 62 is in communication with a display 64, which is in communication with a processor 66 which controls the operation of the winch 52 to let out or take in additional tow cable 34.

A display at the stop shows acceleration levels. The cable length can be changed at the winch in predetermined amounts (e.g., 100 feet). A history of acceleration levels at each length is built up until the optimal length is obtained which minimizes the acceleration seen by the towed component. The entire process can easily be automated with a personal computer (PC) or some other processor that contains an algorithm that stores the history of acceleration levels vs. cable length and controls the winch to change the cable length until the optimal length is reached.

It will be appreciated that a method has been provided which effectively reduces strum in tow cables.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for reducing strum in a tow cable extending from a marine vessel, said cable having an adjustable length and there being in said cable at least one longitudinal wave and at least one transverse wave wherein the cable has a proximate end on the marine vessel and an opposed distal end where at said proximate end the cable has a rigid boundary and at the distal end the cable has a free boundary; and the cable is connected to a means for varying the cable length at the proximate end of the cable; and there is a towed component at the distal end of the cable and an acceleration measuring means capable of providing a reading is positioned adjacent the distal end of the cable; and the length of cable being adjusted based upon the reading from said acceleration measuring means such that the number of longitudinal waves is about an integral number.

2. The method of claim 1 wherein the number of longitudinal wavelengths in the cable is from 1 to about 10.

3. The method of claim 1 wherein the number of transverse wavelengths in the cable is from about 100 to about 1,000,000.

4. The method of claim 1 wherein each of the transverse waves has a propagation speed Ct, which is about equal to:

$$Ct=\sqrt{Tg/W}$$

wherein T is the cable tension, W is cable weight per unit length and g is 9.81 m/sec$^2$ and the longitudinal wave has a propagation speed Cl, which is about equal to:

$$Cl=\sqrt{E/\rho},$$

wherein E is the cable Young's modulus and $\rho$ is cable density.

5. The method of claim 1 wherein each of the longitudinal waves is a standing wave.

6. The method of claim 1 wherein each of the transverse waves is a moving wave.

7. The method of claim 6 wherein the cable also has a transverse component of motion and a curvature and said transverse component of motion is corrected into a longitudinal component motion to generate the longitudinal waves.

8. The method of claim 6 wherein the transverse component of motion creates a localized region of curvature in the cable which shortens the cable.

9. The method of claim 1 wherein the cable has a longitudinal vibration component of motion.

10. The method of claim 9 wherein the longitudinal waves have a longitudinal wave frequency and the transverse wave has a transverse wave frequency and the longitudinal wave frequency is twice the transverse wave frequency.

11. The method of claim 1 wherein the means for varying the length of the cable is a winch.

12. The method of claim 11 wherein means are provided to display readings of the acceleration measuring means.

13. The method of claim 12 wherein there is an acceleration at the distal end of the cable and a computer processing system is provided to perform processing needed to minimize said acceleration at the distal end of the cable.

14. The method of claim 13 wherein there are previous minimizations of acceleration and a present minimization of acceleration and the computer processing system stores a history of said previous minimizations of acceleration as a function of cable length to be factored into said present minimization.

15. The method of claim 13 herein the cable is deployed by means of revolutions of the winch and the computer processing system monitors the deployed cable length at all times by monitoring the number of winch revolutions.

16. A method for reducing strum in a tow cable having a distal end extending from an adjustable length and there being in said cable at least one longitudinal wave and one transverse wave, said method comprising the steps of:

providing a winch for adjusting the length of the cable;

measuring acceleration at the distal end of the cable; and adjusting the length of the cable based on acceleration at the distal end of the cable so that the number of longitudinal waves is about an integral number.

* * * * *